United States Patent
Haegele

(10) Patent No.: US 6,928,441 B2
(45) Date of Patent: Aug. 9, 2005

(54) ELECTRONIC CATALOGS THAT PROVIDE HIERARCHICAL ACCESS FOR BUYERS OF GOODS AND SERVICES

(75) Inventor: Gerald Eugene Haegele, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 505 days.

(21) Appl. No.: 10/123,630

(22) Filed: Apr. 16, 2002

(65) Prior Publication Data

US 2003/0195817 A1 Oct. 16, 2003

(51) Int. Cl.$^7$ .............................................. G06F 17/30
(52) U.S. Cl. .............................. 707/9; 707/3; 707/10; 709/203; 709/219; 705/26; 705/27
(58) Field of Search .............................. 707/2, 3, 9, 10, 707/102, 104.1; 709/203, 219; 705/26, 27

(56) References Cited

U.S. PATENT DOCUMENTS

| | | | |
|---|---|---|---|
| 5,319,542 A | | 6/1994 | King, Jr. et al. ............... 705/27 |
| 5,870,717 A | * | 2/1999 | Wiecha ........................ 705/26 |
| 6,192,373 B1 | | 2/2001 | Haegele .................... 707/104.1 |
| 6,275,821 B1 | * | 8/2001 | Danish et al. .................. 707/3 |
| 6,324,522 B2 | * | 11/2001 | Peterson et al. .............. 705/28 |
| 6,453,353 B1 | * | 9/2002 | Win et al. .................... 709/229 |
| 2002/0194008 A1 | * | 12/2002 | Yang et al. ..................... 705/1 |

* cited by examiner

Primary Examiner—Leslie Wong
(74) Attorney, Agent, or Firm—Schmeiser, Olsen & Watts; John R. Pivnichny

(57) ABSTRACT

A catalog system for Internet commerce that supports a hierarchy of buyers specified by a customer includes: a general catalog, a buyer attributes database, and a terms and conditions database. A contract catalog is created for a customer by filtering the general catalog according to customer-specific information stored in the terms and conditions database. The customer-specific information includes hierarchical attributes for the items in the contract catalog. When a buyer enters the catalog system, the buyer's hierarchical level is determined by reading the buyer attributes database, and compared with the hierarchical attributes of the items in the contract catalog. The buyer is granted access to those items in the contract catalog that have hierarchical attributes which do not exceed the buyer's hierarchical level.

23 Claims, 6 Drawing Sheets

500

| ContractID | BuyerGroupName | Hierarchicallevel |
|---|---|---|
| 1010 | Madison | 001 |
| 1010 | Local Governments | 001001 |
| 1010 | Education | 001002 |
| 1010 | University | 001002001 |
| 1010 | Graduate Programs | 001002001001 |
| 1010 | WestLake University | 001002001001001 |
| 1010 | College of Physical Sciences | 001002001001001001 |
| 1010 | Physics Department | 001002001001001001001 |
| 1010 | Physics Research Lab | 001002001001001001002 |
| 1010 | UnderGraduate Programs | 001002001002 |
| 1010 | University of Madison | 001002001002001 |
| 1010 | Courts | 001003 |
| 1010 | Appeals | 001003001 |
| 1010 | District | 001003002 |
| 1010 | Supreme | 001003003 |
| 1010 | State Agencies | 001004 |
| 1010 | DMV | 001004001 |
| 1010 | State Police | 001004002 |
| 1010 | Narcotics | 001004002001 |
| 1010 | Computer Crime | 001004002002 |
| 3232 | General Widget | 001 |
| 3232 | Headquarters | 001001 |
| 3232 | Executive Staff | 001001001 |
| 3232 | Administrative Staff | 001001002 |
| 3232 | Sales Staff | 001001003 |
| 3232 | Sales Staff Office | 001001003001 |
| 3232 | Sales Staff Mobile | 001001003002 |
| 3232 | Help Desk Staff | 001001004 |
| 3232 | Non-US Branch Office | 001002 |

BOM Table
| | | |
|---|---|---|
| BOMNumber | varchar(99) | not null, |
| PartNumber | varchar(99) | not null, |
| Price | decimal(6,2) | not null, |
| Color | varchar(99) | not null, |
| Shipping | varchar(99) | not null, |
| Weight | decimal(6,3) | not null, |
| Dimensions | varchar(99) | not null, |
| Availability | varchar(99) | not null, |

PARTNUMBER Table
| | | |
|---|---|---|
| PartNumber | varchar(99) | not null, |
| Description | varchar(99) | not null, |
| Manufacturer | varchar(99) | not null, |

| | | |
|---|---|---|
| BOMNumber | varchar(99) | not null, |
| ContractID | integer | not null, |
| HierarchicalLevel | varchar(99) | not null; |

| | | |
|---|---|---|
| ContractID | varchar(99) | not null, |
| BuyerGroupName | integer | not null, |
| HierarchicalLevel | varchar(99) | not null; |

| ContractID | BuyerGroupName | Hierarchicallevel |
|---|---|---|
| 1010 | Madison | 001 |
| 1010 | Local Governments | 001001 |
| 1010 | Education | 001002 |
| 1010 | University | 001002001 |
| 1010 | Graduate Programs | 001002001001 |
| 1010 | WestLake University | 001002001001001 |
| 1010 | College of Physical Sciences | 001002001001001001 |
| 1010 | Physics Department | 001002001001001001001 |
| 1010 | Physics Research Lab | 001002001001001001002 |
| 1010 | UnderGraduate Programs | 001002001002 |
| 1010 | University of Madison | 001002001002001 |
| 1010 | Courts | 001003 |
| 1010 | Appeals | 001003001 |
| 1010 | District | 001003002 |
| 1010 | Supreme | 001003003 |
| 1010 | State Agencies | 001004 |
| 1010 | DMV | 001004001 |
| 1010 | State Police | 001004002 |
| 1010 | Narcotics | 001004002001 |
| 1010 | Computer Crime | 001004002002 |
| 3232 | General Widget | 001 |
| 3232 | Headquarters | 001001 |
| 3232 | Executive Staff | 001001001 |
| 3232 | Administrative Staff | 001001002 |
| 3232 | Sales Staff | 001001003 |
| 3232 | Sales Staff Office | 001001003001 |
| 3232 | Sales Staff Mobile | 001001003002 |
| 3232 | Help Desk Staff | 001001004 |
| 3232 | Non-US Branch Office | 001002 |

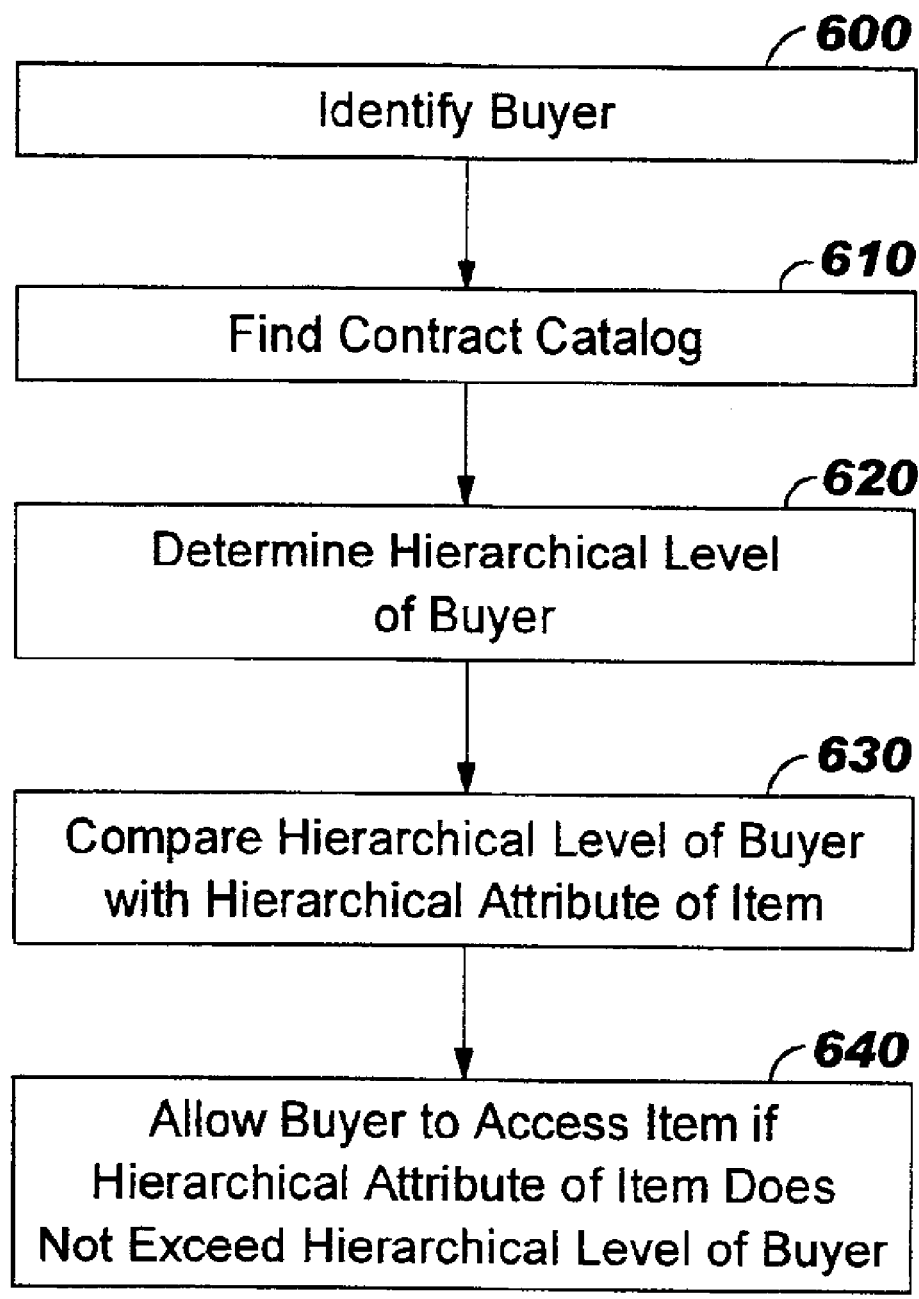

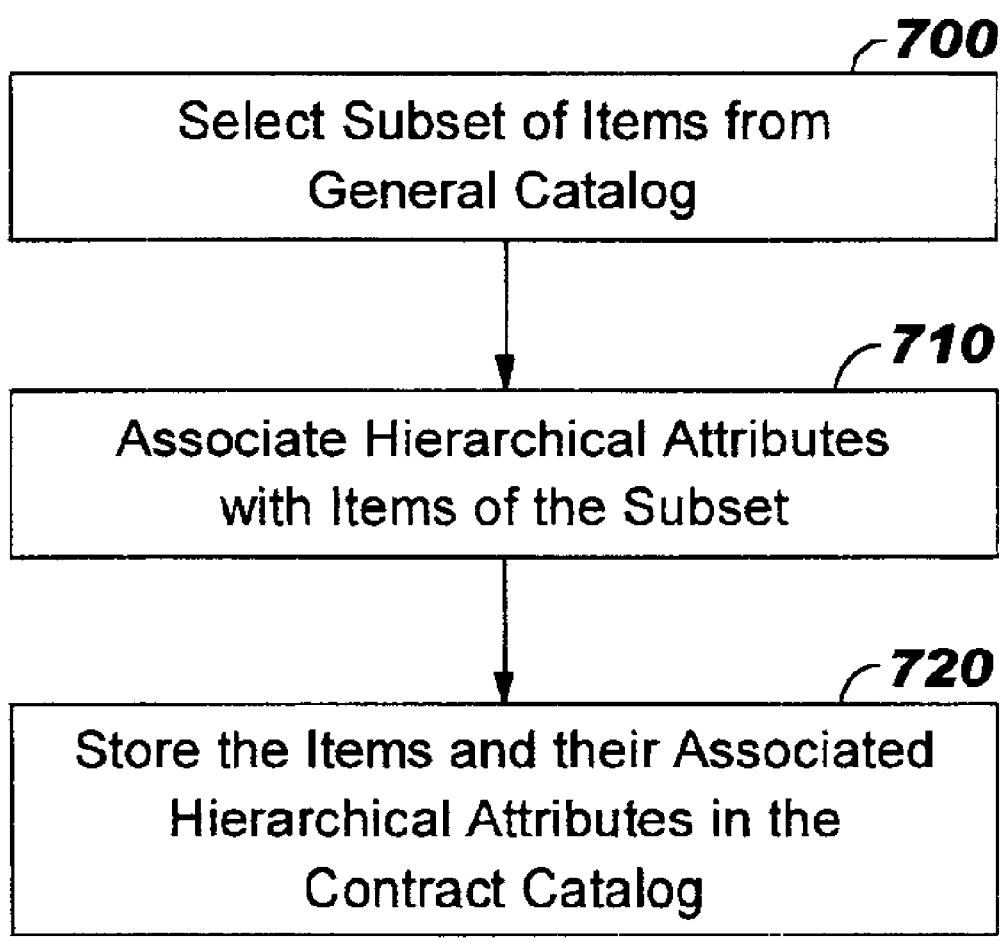

ELECTRONIC CATALOGS THAT PROVIDE HIERARCHICAL ACCESS FOR BUYERS OF GOODS AND SERVICES

FIELD OF THE INVENTION

The present invention relates to the field of electronic commerce, and more particularly to electronic catalogs for Internet commerce.

BACKGROUND

Internet retailers and business-to-business (B2B) providers usually sell from on-line, electronic catalogs that include a range of goods and services. Although this approach works well for Internet retailers who sell to consumers drawn from the general population, business-to-business providers often have customers who demand specific terms and conditions. For example, customers may negotiate contracts with B2B providers that call for predetermined discounts, products that are not normally available to the general public, customer-specific service packages that accompany high-volume orders, and so forth.

Moreover, a given customer may specify that certain of its purchasing agents or buyers have authority to buy some products but not others, depending, for example, upon the agency or department that the buyer represents, or depending upon the buyer's geographical location. Also, some contracts may enable employees of the customer to buy from the provider under negotiated terms. For example, a high-volume customer who buys a large number of personal computers for business use may require the provider to sell the same personal computers at a discount to employees of the customer, but where the discount to an individual employee may be less than the discount to the high-volume customer, or where a service package available to an individual employee may be different from the service package available to the high-volume customer.

In pursuit of the flexibility needed to comply with the terms of individual contracts, a provider normally creates a custom catalog for each set of circumstances. As a result, a provider may have a multiplicity of custom catalogs. For example, the government of the fictitious State of Madison might require several different catalogs: a catalog for buyers who represent the Department of Public Safety, and a different catalog for buyers who represent the Department of Education. The Department of Education itself may require not only a custom catalog, but also individual catalogs that are further customized to reflect the differing missions of the Office of State Research Universities and the Office of K-6 Programs. In such a situation, buyers who represent the Office of Research Universities and buyers who represent the Office of K-6 Programs might not have the same buying authority, as their needs could differ greatly. For example, the Research Universities and the K-6 Programs may both need office supplies, but the Research Universities would not likely need crayons, nor the K-6 Programs need equipment for binding the pages of doctoral dissertations. Nevertheless, a buyer who represents the Department of Education more broadly on behalf of all the Department's Offices might well need to purchase any of the aforementioned items, and yet might also be barred from purchasing weapons made available to buyers who represent the State Highway Patrol.

These kinds of divisions of purchasing authority put a considerable burden on B2B providers. When an item changes in the provider's general catalog, the change may ripple through dozens of custom catalogs derived from the general catalog. As the need for custom catalogs splits and grows, the enormity of creating and updating the required catalogs, storing them, and processing their contents may in fact become a significant bottleneck in a B2B provider's ultimate capability to serve its existing customers and to accept new customers. Thus there is a need for a more efficient way to provide and manage electronic catalogs, so that buyers are enabled to view and purchase only appropriate subsets of the goods and services offered by an electronic B2B provider.

SUMMARY

In view of the aforementioned limitations and disadvantages of the known ways of providing and managing electronic catalogs, the present invention provides an improved way of creating and updating electronic catalogs for Internet commerce. The invention is broadly applicable to many fields of commerce, including the sales of goods such as computer equipment, software, books, office supplies, furniture, and so forth; and the provision of services such as healthcare, maintenance services, janitorial services, and the like.

The invention includes an improved catalog system for electronic commerce that supports buyers according to a hierarchy specified by a customer, comprising a general catalog, a buyer attributes database, and a terms and conditions database. A contract catalog is created for a customer by filtering the general catalog according to customer-specific information stored in the terms and conditions database. The customer specific information includes hierarchical attributes for items in the contract catalog. When a buyer enters the catalog system, the buyer's hierarchical level is determined by reading the buyer attributes database, and compared with the hierarchical attributes of the items in the contract catalog. The buyer is granted access to those items in the contract catalog that have hierarchical attributes which do not exceed the buyer's hierarchical level. A buyer using a web browser may access the catalog system or a contract catalog over the Internet, although the present invention is not so limited, and applies broadly to the field of electronic catalogs.

These and other aspects of the invention will be appreciated more fully when considered in light of the following drawings and detailed description.

BRIEF DESCRIPTION OF THE DRAWINGS

FIG. 2 shows an exemplary schema of the general catalog.

FIG. 3 shows an exemplary schema of a table of the terms and conditions database.

FIG. 4 shows an exemplary schema of a contract buyer table of the buyer attributes database.

FIG. 5 shows an exemplary contract buyer table of the buyer attributes database.

FIG. 6 is a flowchart that shows a method for providing a contract catalog that enables use by buyers according to a hierarchy of buyers for a given customer.

FIG. 7 is a flowchart that shows a method for creating a contract catalog.

DETAILED DESCRIPTION

Figure 1:
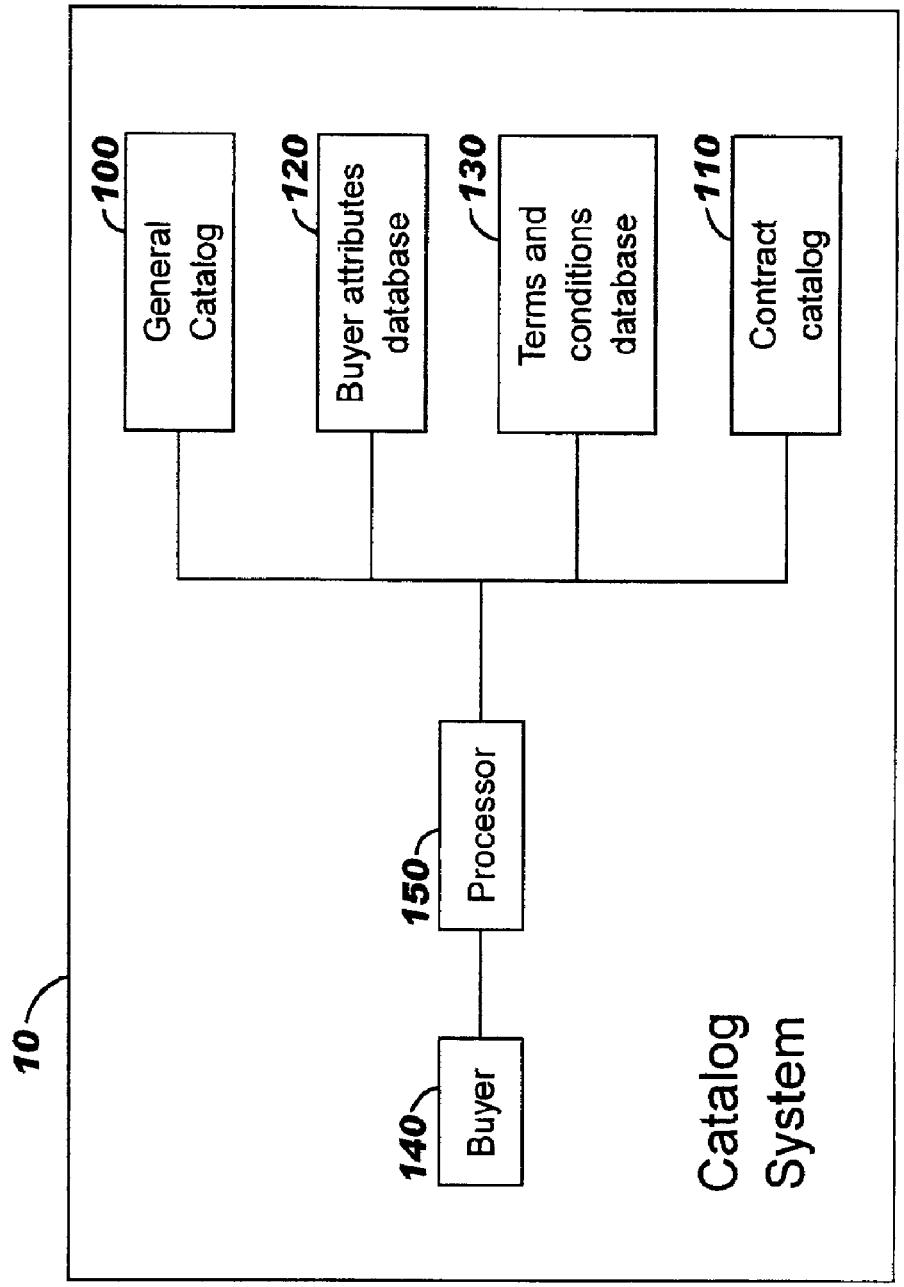
FIG. 1 is a block diagram of a catalog system that includes a general catalog, a buyer attributes database, a terms and conditions database, and a contract catalog.

As shown in FIG. 1, one embodiment of the invention is a catalog system 10 for a provider engaged in electronic commerce, which includes a general catalog 100, a contract catalog 110, a buyer attributes database 120, a terms and conditions database 130, and a processor 150. The processor 150 provides a point for a buyer 140 into the catalog system 10, and coordinates the operations of the elements of the catalog system 10. The processor 150 may be a microprocessor or other logic, which may be included in a workstation such as a personal computer or which may be stand-alone or subsumed by another component of the catalog system 10. Further, the structural distinctions shown in FIG. 1 among the general catalog 100, the contract catalog 110, the buyer attributes database 120, and the terms and conditions database 130 are for descriptive convenience only; various implementations of the invention may combine these components in various ways that will be understood by those skilled in the art once taught the present invention.

In the context of the present invention, the general catalog 100 may be persistent in a data store such as a file or database, typically a relational database. In the general catalog 100, each item (good or service) offered by the provider has an item identifier, such as a Stock Keeping Unit (SKU), part number, or bill of materials (BOM) identifier. The general catalog 100 may also contain ordinary attributes of the items, for example their descriptions, dimensions, colors, list prices, and so forth. An exemplary schema 200 of the general catalog 100 is shown in FIG. 2. In the interest of clarity, the exemplary schema 200 shows only two tables for describing items, a BOM table and a part-number table. In practice, the general catalog 100 could, of course, have many more tables.

The contract catalog 110, which is derived from the general catalog 100 for the use of buyers who represent the customer's interests or a limited aspect of the customer's interests, is created by filtering the general catalog 100 according to rules provided by the terms and conditions database 130. The rules of the terms and conditions database 130 may be specified by a contract between the customer and the provider.

The terms and conditions database 130 contains records concerning the items in the general catalog 100 that are accessible to the customer. An item is accessible to the customer if at least one buyer who represents the customer may view and/or purchase that item. Again, items may be identified by the SKUs, part numbers, Bill of Materials (BOM) numbers, and so forth used in the general catalog 100. FIG. 3 shows an exemplary schema 300 of a terms and conditions table in the terms and conditions database 130, wherein items are identified by BOM numbers. The items in the terms and conditions database 130 have hierarchical attributes. The hierarchical attribute of a given item indicates which buyers, according to levels in a hierarchy of buyers, have access to that item (i.e., are permitted to view and/or purchase the item), as described below.

Each of a customer's buyers has a predetermined level in a hierarchy of buyers for that customer. For example, buyers who have unrestricted purchasing authority for a State Government may occupy the highest level in the hierarchy for the customer "State Government," buyers for the various Departments of the State Government might occupy the second level down, buyers for an Office of a Department might occupy the third level, and so forth. Information about each customer's hierarchy of buyers is stored in the buyer attributes database 120.

To understand the use of hierarchy further according to the present invention, assume, for example, that the fictitious state "Madison" and a fictitious company "General Widget" both have contracts to purchase personal computers from a provider called "Acme PC." For this example, FIG. 4 shows an exemplary schema 400 of a contract buyer table 500, which in turn is shown in FIG. 5. The contract buyer table 500 may be kept in the buyer attributes database 120 of FIG. 1.

The exemplary contract buyer table 500 has three columns of entries. The first column is called "Contract ID," and takes integer values, as indicated by the first row of the associated schema 400. In the exemplary contract buyer table 500, the State of Madison has Contract ID 1010, and General Widget has contract ID 3232. Although FIG. 5 shows information only for the State of Madison and General Widget, buyer hierarchies for all customers that have contracts with the provider may be put into a single contract buyer table and differentiated by entries in the Contract ID column, where each different Contract ID identifies a contract between a customer and the provider.

The second row of the schema 400 indicates that the second column of the contract buyer table 500 is called "Buyer Group Name," and accommodates entry lengths up to 35 characters. The third row of the schema 400 indicates that the third column of the contract buyer table 500 is called "Hierarchical Level," and accommodates entry lengths up 99 characters. Given the structure just described, the contract buyer table 500 may be queried by an SQL command such as:

select *from contractbuyer by contractID, hierarchicallevel

In a preferred embodiment of the invention, entries in the hierarchical level column of the contract buyer table 500 have lengths that are integer multiples of three characters, with a minimum length of three characters. Buyers whose hierarchical levels have a length of three characters are then roots of a buyer tree, and are at the highest level of the buyer hierarchy for a given Contract ID. In general, the hierarchical level of a buyer is determined in this embodiment of the invention by examining the length (in characters) of the buyer's hierarchical level. The length divided by three is the level of the buyer in the hierarchy. For example, the length of hierarchical level "001002001001001001002" is twenty-one, and the level of that buyer is therefore seven in the buyer hierarchy.

Level in the buyer hierarchy determines which items in the contract catalog 110 a buyer may access: a buyer having a given hierarchical level is permitted to navigate down from that level in the buyer tree to which that buyer belongs. A buyer may access items within the scope of the buyer's Contract ID that have hierarchical attributes indicative of the buyer's tree and which have hierarchical attributes that do not exceed the buyer's hierarchical level. Here, a first hierarchical attribute or level is said not to exceed a second hierarchical attribute or level if the position of first is at or below the position of the second, and both are in the same tree.

For example, the buyer identified in FIG. 5 as General Widget, contract ID 3232, has hierarchical level "001," and may therefore access any item available to the customer specified by Contract ID 3232. However, the buyer identified as General Widget "Sales Staff" has a hierarchical level "001001003," and may therefore access only items at or beneath that level along the particular tree that includes "001001003.". In this example, the "Sales Staff" buyer may access items for the entire sales staff, both office and mobile. However, the buyer "Sales Staff Mobile" may access only items that are available to hierarchical level "001001003002," since nothing is listed lower in the hierarchy.

In another example drawn from FIG. 5, the buyer under contract 1010, State of Madison, with hierarchical level "001004" (State Agencies) may access items from the contract catalog 110 that have the hierarchical attributes "001004", and below along the same tree, which are "001004001" (DMV) "001004002" (State Police), "001004002001" (State Police, Narcotics), and "001004002002" (State Police, Computer Crime). However, the State Agencies buyer with hierarchical level "001004" cannot access items in the contract catalog 110 in trees whose roots have hierarchical attributes "001003" (Courts) and below, "001002" (Education) and below, and so forth, as these are in different trees.

As a convenience useful in determining whether one level does not exceed another, a list of buyers below a given buyer may be created using an SQL query such as:

select *from contractbuyer where contractID=1010 and hierarchicallevel like '001004%' order by hierarchical level

In the example concerning the State of Madison Government, the above query retrieves, for the "buyer agencies" (001004), the following rows from the exemplary contract buyer table 500:

| 1010 | State Agencies | 001004 |
|------|---------------|--------|
| 1010 | DMV | 001004001 |
| 1010 | State Police | 001004002 |
| 1010 | Narcotics | 001004002001 |
| 1010 | Computer Crime | 001004002002 |

As mentioned above, the contract catalog 110 may be created as a subset of the general catalog 100, where content of the subset and hierarchical attributes associated with the items of the subsets are determined according to information from the terms and conditions database 130. The contract log 110 may be created in either of two ways: batch or real time.

In batch mode, the contract catalog 110 is created using SQL statements and stored persistently in a relational database, which may be displayed in real-time via SQL queries. In real-time mode, when the physical store of the general catalog 100 is a relational database, it is not necessary that the contract catalog 110 actually exist persistently in a relational database; rather, equivalent information may be generated ephemerally in real time as needed, for example by query of the general catalog 100, joining information from the terms and conditions database 130 and the general catalog 100 dynamically by means of SQL statements to provide a logical view. Thus the structure shown in FIG. 1 is illustrative rather than limiting—it is not a requirement of the invention that the contract catalog 110 exist as a literal database.

The method of FIG. 6 illustrates a way in which the hierarchical levels of buyers and the hierarchical attributes of items may be used to advantage according to the present invention. The buyer 140 is identified upon entering the catalog system 10 (step 600), and the contract catalog for the customer represented by the buyer is found (step 610). Identification of the buyer may be explicit in response to a query, or may be implicit, for example by association of the buyer 140 with a purchasing number or other identifying mark. The catalog system 10 then determines the buyer's hierarchical level by reading the buyer attributes database 120 (step 620). For each item in the contract catalog 110, or for any particular item, the hierarchical level of the buyer is compared with the hierarchical attribute of the item (step 630). If the hierarchical attribute of the item does not exceed the hierarchical level of the buyer, and if both occur in the same tree, the buyer is allowed to access the item (step 640).

FIG. 7 shows a method for creating the contract catalog 110 of items selectively accessible to buyers who represent a customer. A subset of items is selected from the provider's general catalog 100 (step 700), based on information supplied by the customer. These are the items that are accessible to the customer. Selection information may be conveyed by a contract between the customer and the provider, and stored in the terms and conditions database 130. Here, the word "subset" is used in the following way: a subset of the general catalog may include all of the items of the general catalog, but is not required to include all of the items and may instead include some (but not all) of the items of the general catalog. Thus, the word "subset" is used in a mathematical sense that makes a distinction between a subset and a "proper subset."

Hierarchical attributes are associated with the items of the subset (step 710), for example by reading the information provided by the customer and stored earlier in the terms and conditions database 130. The items of the subset and their associated hierarchical attributes are stored in the contract catalog 110 (step 720), which may be held persistently in a relational database.

Figure 8:
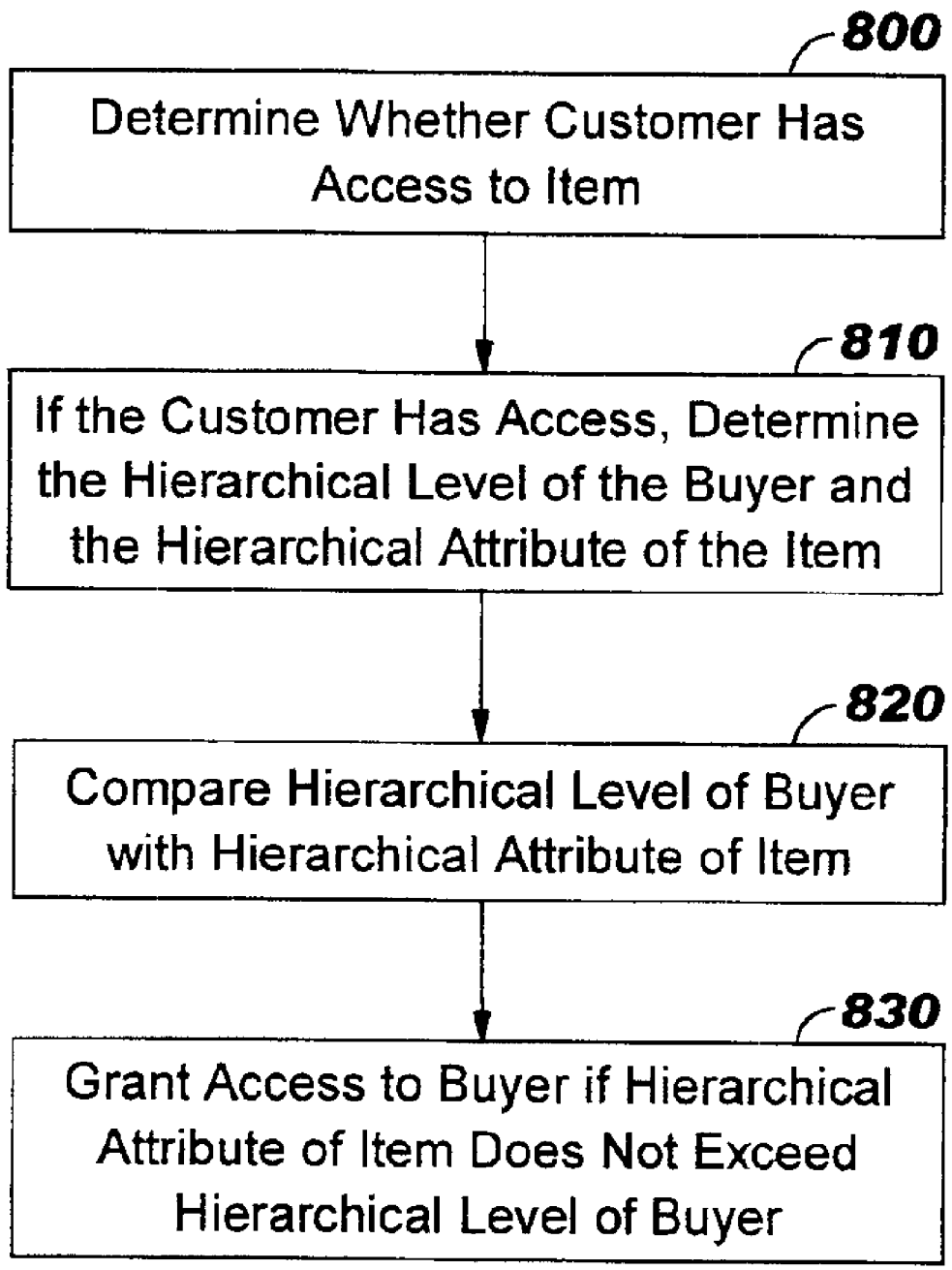
FIG. 8 is a flowchart that shows a method for selectively granting a buyer access to an item offered by an electronic commerce provider.

FIG. 8 shows a method for selectively granting a buyer who represents a customer access to an item offered by an electronic commerce provider. A determination is made as to whether or not the customer has access to the item (step 800), for example by comparing the item's identifier to the identifiers of items accessible to the customer stored earlier in the terms and conditions database 130. If the customer has access to the item, the hierarchical attribute of the item and the hierarchical level of the buyer are determined (step 810), for example by reading the terms and conditions database 130 and the buyer attributes database 120, respectively. The hierarchical level of the buyer and the hierarchical attribute of the item are compared (step 820). If the hierarchical attribute of the item does not exceed the hierarchical level of the buyer, the buyer is granted access to the item (step 830). This method does not require or presume that a contract catalog exists persistently in a database, although the method may also be used in that context.

From the preceding description, those skilled in the art will now appreciate that the present invention provides an improved system and method for creating and maintaining electronic catalogs for Internet commerce that support a hierarchy of buyers who have differing purchasing authorities as specified by a customer. A further advantage of the invention is that only the general catalog 100, rather than a multiplicity of custom catalogs, needs to be updated when an attribute of an item changes. The foregoing description is illustrative rather than limiting, however, and the scope of the present invention is limited only by the claims that follow.

I claim:

1. A method for creating a contract catalog of items available to a customer of an electronic commerce provider, comprising the computer-implemented steps of:

selecting a subset of items from a general catalog of items offered by the provider;

associating hierarchical attributes with the items of the subset, where a hierarchical attribute associated with an item indicates whether a buyer who has a hierarchical level in a hierarchy of buyers has access to the item, based on a comparison of the hierarchical attribute of the item and the hierarchical level of the buyer, said hierarchical level being expressed as a character string of L characters such that said hierarchical level is a function of L; and storing the items of the subset and the associated hierarchical attributes in the contract catalog.

2. The method of claim 1, wherein the step of associating hierarchical attributes includes a step of reading a terms and conditions database.

3. The method of claim 1, wherein the hierarchy of buyers is stored in a buyer attributes database.

4. A method for selectively granting a buyer access to an item in an electronic catalog, comprising the computer-implemented steps of:

associating hierarchical attributes with items of a subset of items from the electronic catalog, where a hierarchical attribute associated with the item indicates whether the buyer who has a hierarchical level in a hierarchy of buyers has access to the item, based on a comparison of the hierarchical attribute of the item and the hierarchical level of the buyer, said hierarchical level being expressed as a character string of L characters such that said hierarchical level is a function of L;

determining a hierarchical level of the buyer and a hierarchical attribute of the item; and comparing the hierarchical attribute of the item with the hierarchical level of the buyer;

if the hierarchical attribute of the item does not exceed the hierarchical level of the buyer, granting the buyer access to the item in the electronic catalog.

5. A method for selectively granting a buyer, who represents a customer, access to an item in an electronic catalog of a provider, comprising the computer-implemented steps of:

associating hierarchical attributes with items of a subset of items from the electronic catalog, where a hierarchical attribute associated with the item indicates whether the buyer who has a hierarchical level in a hierarchy of buyers has access to the item, based on a comparison of the hierarchical attribute of the item and the hierarchical level of the buyer, said hierarchical level being expressed as a character string of L characters such that said hierarchical level is a function of L;

determining a hierarchical level of the buyer and a hierarchical attribute of the item;

comparing the hierarchical attribute of the item with the hierarchical level of the buyer; and if the hierarchical attribute of the item does not exceed the hierarchical level of the buyer, granting the buyer access to the item in the electronic catalog.

6. A catalog for electronic commerce, said catalog being stored in a memory, said catalog comprising:

items available to a buyer, wherein hierarchical attributes are associated with items of a subset of items from the catalog, where a hierarchical attribute associated with an item indicates whether the buyer who has a hierarchical level in a hierarchy of buyers has access to the item, based on a comparison via a processor of the associated hierarchical attribute of the item and the hierarchical level of the buyer, said hierarchical level being expressed as a character string of L characters such that said hierarchical level is a function of L.

7. A catalog system for electronic commerce, comprising:

a processor and a memory;

a contract catalog that includes an item available to a customer and a hierarchical attribute that is stored in the contract catalog in association with the item, wherein the contract catalog is store in the memory, wherein the hierarchical attribute indicates whether a buyer who has a hierarchical level in a hierarchy of buyers specified by the customer has access to the item, based on a comparison by the processor of the hierarchical attribute of the item with the hierarchical level of the buyer, said hierarchical level being expressed as a character string of L characters such that said hierarchical level is a function of L; and a terms and conditions database for storing hierarchical attributes in association with items, including said hierarchical attribute stored in the contract catalog in association with said item.

8. A catalog system for electronic commerce, comprising:

a processor and a memory;

a general catalog of items offered by a provider, said general catalog being stored in the memory;

a terms and conditions database for storing hierarchical attributes in association with items that are accessible to a customer of the provider, wherein the items accessible to the customer are a subset of the items of the general catalog, and further wherein a hierarchical attribute associated with an item indicates whether a buyer who represents the customer has access to said item based on a comparison by the processor of the hierarchical attribute of said item and a hierarchical level of the buyer, said hierarchical level being expressed as a character string of L characters such that said hierarchical level is a function of L;

a buyer attributes database for storing the hierarchical level of the buyer; and a contract catalog that includes the items accessible to the customer and associated hierarchical attributes.

9. A catalog system for electronic commerce, comprising:

a process and a memory;

a general catalog of items offered by a provider, said general catalog being stored in the memory;

a terms and conditions database for storing item identifiers and associated hierarchical attributes of items that are accessible to a customer of the provider, wherein the items accessible to the customer are a subset of the items of the general catalog, and further wherein a hierarchical attribute associated with an item indicates whether a buyer who represents the customer has access via the processor to said item based on a comparison by the processor of the hierarchical attribute of said item and the hierarchical level of the buyer, said hierarchical level being expressed as a character string of L characters such that said hierarchical level is a function of L;

a buyer attributes database for storing hierarchical levels of buyers who represent the customer; and a processor for comparing the hierarchical attributes of the items of the subset with the hierarchical levels of the buyers, and in response granting the buyers access to selected items of the subset.

10. The method of claim 1, wherein said character string is organized as a sequence of groups of characters, each group consisting of N characters such that said hierarchical level is equal to L divided by N.

11. The method of claim 10, wherein L=N denotes a root hierarchical level of the hierarchy of buyers.

12. The method of claim 4, wherein said character string is organized as a sequence of groups of characters, each group consisting of N characters such that said hierarchical level is equal to L divided by N.

13. The method of claim 12, wherein L=N denotes a root hierarchical level of the hierarchy of buyers.

14. The method of claim 5, wherein said character string is organized as a sequence of groups of characters, each group consisting of N characters such that said hierarchical level is equal to L divided by N.

15. The method of claim 14, wherein L=N denotes a root hierarchical level of the hierarchy of buyers.

16. The method of claim 6, wherein said character string is organized as a sequence of groups of characters, each group consisting of N characters such that said hierarchical level is equal to L divided by N.

17. The method of claim 16, wherein L=N denotes a root hierarchical level of the hierarchy of buyer.

18. The method of claim 7, wherein said character string is organized as a sequence of groups of characters, each group consisting of N characters such that said hierarchical level is equal to L divided by N.

19. The method of claim 18, wherein L=N denotes a root hierarchical level of the hierarchy of buyers.

20. The method of claim 8, wherein said character string is organized as a sequence of groups of characters, each group consisting of N characters such that said hierarchical level is equal to L divided by N.

21. The method of claim 20, wherein L=N denotes a root hierarchical level of the hierarchy of buyers.

22. The method of claim 9, wherein said character string is organized as a sequence of groups of characters, each group consisting of N characters such that said hierarchical level is equal to L divided by N.

23. The method of claim 22, wherein L=N denotes a root hierarchical level of the hierarchy of buyers.

* * * * *

UNITED STATES PATENT AND TRADEMARK OFFICE
CERTIFICATE OF CORRECTION

PATENT NO. : 6,928,441 B2
DATED : August 9, 2005
INVENTOR(S) : Haegele

It is certified that error appears in the above-identified patent and that said Letters Patent is hereby corrected as shown below:

<u>Column 8,</u>
Line 6, delete "store" and insert -- stored --.
Line 41, delete "process" and insert -- processor --.

<u>Column 9,</u>
Line 20, delete "buyer" and insert -- buyers --.

Signed and Sealed this

Eighteenth Day of October, 2005

JON W. DUDAS
*Director of the United States Patent and Trademark Office*